US010428989B2

(12) United States Patent
Linhorst et al.

(10) Patent No.: US 10,428,989 B2
(45) Date of Patent: Oct. 1, 2019

(54) MATERIAL HANDLING UNLOAD TEE WITH ONE ACTION PIVOTABLE DOOR

(71) Applicant: Bray International, Inc., Houston, TX (US)

(72) Inventors: Thomas A. Linhorst, Perryville, MO (US); John Long, Festus, MO (US)

(73) Assignee: Bray International, Inc., Houston, TX (US)

( * ) Notice: Subject to any disclaimer, the term of this patent is extended or adjusted under 35 U.S.C. 154(b) by 0 days.

(21) Appl. No.: 15/874,129

(22) Filed: Jan. 18, 2018

(65) Prior Publication Data

US 2018/0142825 A1 May 24, 2018

Related U.S. Application Data

(62) Division of application No. 14/936,110, filed on Nov. 9, 2015, now Pat. No. 9,909,705.

(60) Provisional application No. 62/077,041, filed on Nov. 7, 2014.

(51) Int. Cl.
*F16L 41/02* (2006.01)
*F16L 55/24* (2006.01)

(52) U.S. Cl.
CPC ............ *F16L 41/021* (2013.01); *F16L 55/24* (2013.01)

(58) Field of Classification Search
CPC ....... F16L 41/021; F16L 55/24; F16L 29/007; F16K 1/18; F16K 1/20
USPC ....................................... 222/504; 285/284.1
See application file for complete search history.

(56) References Cited

U.S. PATENT DOCUMENTS

| 1,783,621 | A | * | 12/1930 | Johnson | F16K 1/2028 251/144 |
|---|---|---|---|---|---|
| 4,848,396 | A | * | 7/1989 | Sisk | B65G 53/52 137/375 |
| 5,842,681 | A | * | 12/1998 | Sisk | B65D 90/623 251/144 |
| 2002/0187013 | A1 | * | 12/2002 | Campbell | B65G 53/10 406/127 |
| 2009/0107329 | A1 | * | 4/2009 | Lee | B01D 46/02 95/22 |
| 2009/0211655 | A1 | * | 8/2009 | Sisk | B60P 3/225 137/614.06 |
| 2009/0212555 | A1 | * | 8/2009 | Sisk | F16L 41/021 285/133.11 |
| 2012/0261602 | A1 | * | 10/2012 | Sisk | B60P 1/56 251/293 |
| 2013/0168956 | A1 | * | 7/2013 | Sisk | F16L 41/021 285/126.1 |
| 2014/0110932 | A1 | * | 4/2014 | Gramling | B65D 90/623 285/126.1 |

* cited by examiner

*Primary Examiner* — Benjamin R Shaw
(74) *Attorney, Agent, or Firm* — Oathout Law Firm; Mark A. Oathout

(57) ABSTRACT

An unload tee has a tee body with a front side and a rear side. The tee body includes an extendable link pivotally connected to the front side of the tee body wherein the extendable link is slidable from a first position wherein the extendable link is shortened to a second position wherein the extendable link is lengthened. An arm is pivotally connected at an opposite end of the extendable link and a door is pivotally connected to an end of the arm unconnected to the shaft. The door is configured to cover an opening of the tee body, wherein an end of the door unconnected to the arm is pivotally connected proximate the rear side of the tee body.

14 Claims, 7 Drawing Sheets

MATERIAL HANDLING UNLOAD TEE WITH ONE ACTION PIVOTABLE DOOR

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

Exemplary embodiments disclosed herein relate to techniques for unload tees used in transporting materials.

Unload tees are used in a variety of industries to transport and deliver bulk materials. Unload tees may be installed at the bottom of transportation vehicles (or other difficult to reach places) and further, conventional unload tees may be difficult to operate at certain angles or in certain situations. This may result in haphazard securing of the tee when delivery is complete, resulting in damage to the assembly and/or vehicle. Thus, there is a need for an improved unload tee that is secure, safe and allows for ease of operation.

BRIEF SUMMARY

An unload tee has a tee body with a front side and a rear side. The tee assembly includes an extendable link pivotally connected at one end to the tee body and at the other end to the handle, which also acts as part of the linkage. This extendable link allows for the compact storage of the linkage while in the 'closed' position and also allows the linkage to have the necessary span to allow the door to be completely out of the path of the falling material when the tee is in the 'open' position.

The door is located on the very bottom of the tee body and is situated to cover an opening that extends from the very top through to the bottom, allowing for the passage of material through the tee. The door is pivotally connected to the 'rear' of the tee body and at the 'front' side it is pivotally connected to the handle, which as previously stated, is also connected to one end of the extendable link.

BRIEF DESCRIPTION OF THE DRAWINGS

The exemplary embodiments may be better understood, and numerous objects, features, and advantages made apparent to those skilled in the art by referencing the accompanying drawings. These drawings are used to illustrate only exemplary embodiments, and are not to be considered limiting of its scope, for the disclosure may admit to other equally effective exemplary embodiments. The figures are not necessarily to scale and certain features and certain views of the figures may be shown exaggerated in scale or in schematic in the interest of clarity and conciseness.

DESCRIPTION OF EXEMPLARY EMBODIMENT(S)

The description that follows includes exemplary apparatus, methods, techniques, and instruction sequences that embody techniques of the inventive subject matter. However, it is understood that the described exemplary embodiments may be practiced without these specific details.

Figure 1:
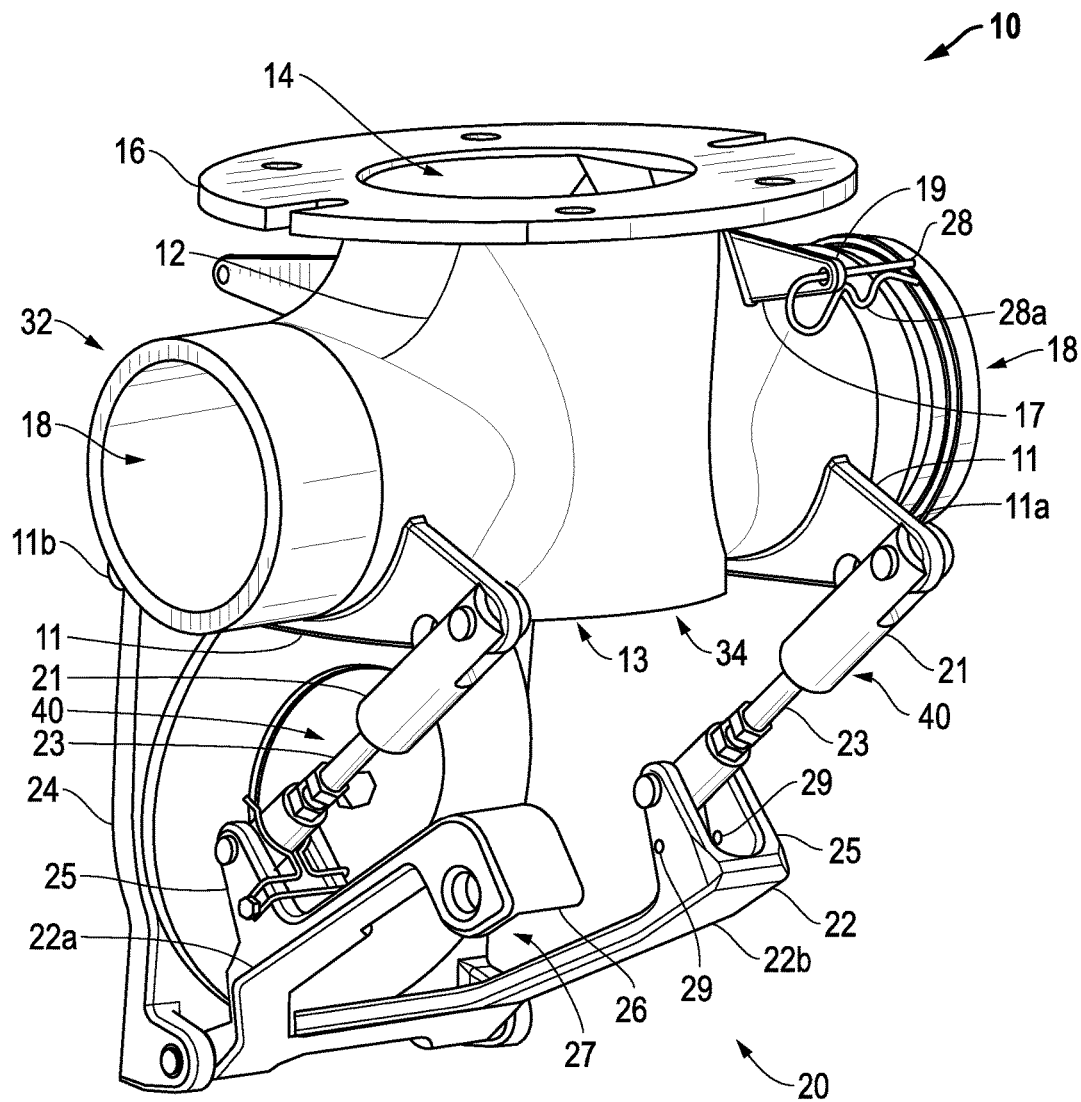
FIG. 1 depicts a perspective view of an exemplary embodiment of an unload tee in a fully open position.
Figure 1A:
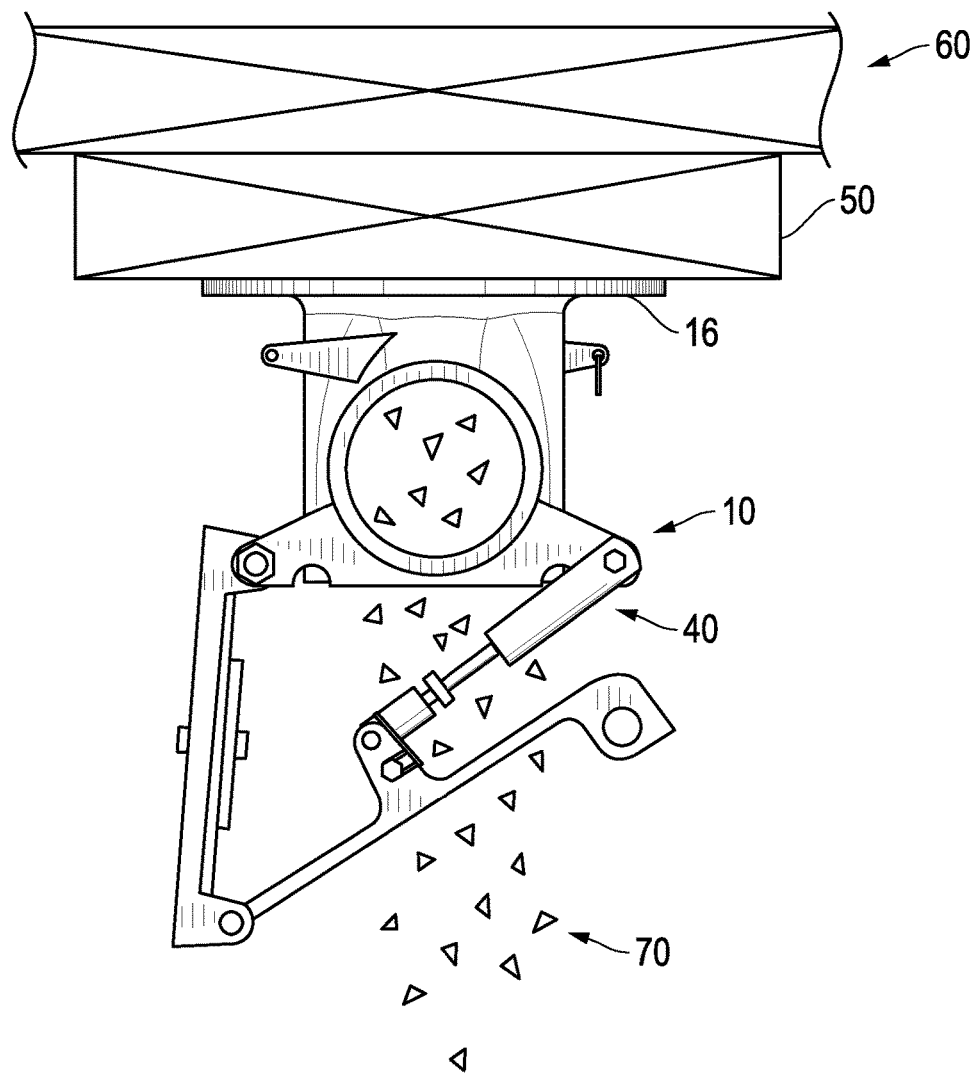
FIG. 1A depicts a schematic view of an exemplary embodiment of a transportation vehicle or storage vessel, valve and unload tee with the unload tee in a fully open position delivering a volume of material.

FIG. 1 depicts a perspective view of an exemplary embodiment of an unload tee 10 in a fully open position. FIG. 1A depicts a schematic view of an exemplary embodiment of the unload tee 10 in the fully open position delivering a volume of material 70 below a transportation vehicle 60 and valve 50. The unload tee 10 has a tee body 12 which defines a bore 14 that travels through the tee body 12. As known to one having ordinary skill in the art, at one end of the bore 14 is a flange 16 configured for attaching or mounting to a controllable valve 50 (such as, for example, a butterfly valve) sandwiched between the flange 16 and a transportation vehicle/storage vessel 60 (or other pipe or conduit system to which the unload tee 10 is connected). At the opposite end of the bore 14 from flange 16 (and forming part of the bore 14) is an opening 13, which is covered by the tee door 24 when the unload tee 10 is in a closed position (see FIG. 2). Further, the tee body 12 may have coupling ends 18 at an axis perpendicular to the bore 14. The coupling ends 18 as known to one having ordinary skill in the art may run along the vehicle/storage vessel 60 and/or may connect the unload tee 10 for establishing flow along the vehicle 60 to pipes, hoses, tees or other fittings as part of the materials transport or pipe system. The unload tee 10 may further be characterized by having a front or operating side 30 and a back or rear side 32. The operating or front side 30 may be the face, plane or side of the unload tee 10 that the operator of the transport or pipe system substantially interacts with to manipulate or change the position of the unload tee 10 and/or the control valve.

The unload tee 10 further includes a plurality of beams 11 which extend outwards from the tee body 12 and are coupled to a door assembly 20. The beams 11 may further be characterized into front beams 11a on the front side 30 and rear beams 11b on the rear side 32. Both front and rear beams 11a, 11b may both be located towards the lower end or underside 34 of the body 12 (or towards the opening 13 for the door 24). Additionally, the unload tee 10 may optionally include one or more projection(s) or keeper(s) 17, one of which may define a fastener port 19 for use with securing and/or latching the door assembly 20 into the closed position. Other means for safely securing the door assembly 20 to the tee body 12 in the closed position may be implemented as known to one having ordinary skill in the art.

Figure 6:
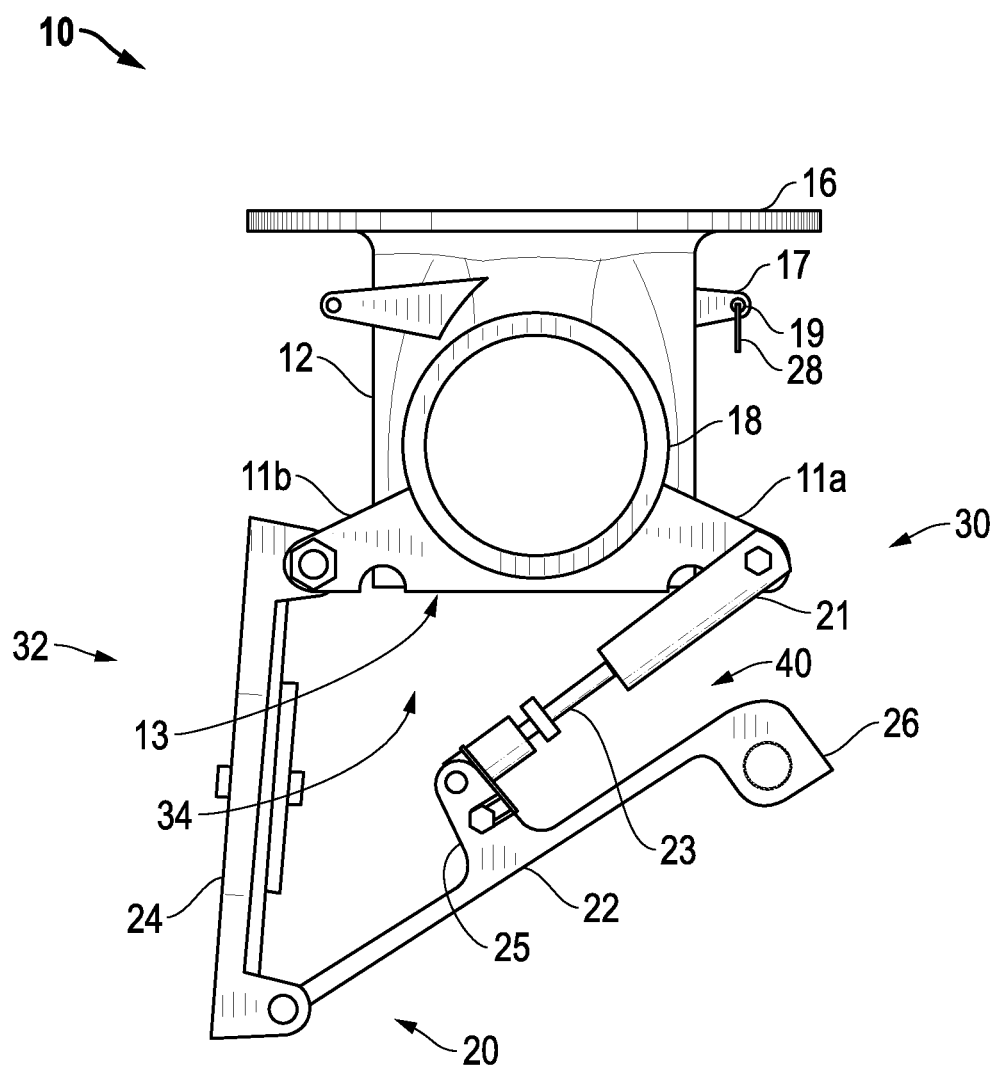
FIG. 6 depicts a side view of an exemplary embodiment of an unload tee in a fully open position following the position of FIG. 5 when opening.

The door assembly 20 of the unload tee 10 in an exemplary embodiment includes the door 24, at least one arm 22 (two shown), a handle or lever 26, and at least one extendable links 40 (two shown). In one embodiment, assuming two extendable links 40, the two extendable links 40 are made of two barrels 21, and two shafts 23. Each barrel 21 is pivotally and/or rotatably coupled to one of the front beams 11a of the tee body 12. The barrels 21 should be configured to have a range of rotation such that the barrels 21 may be able to rotate, invert or reverse beneath the underside 34 of the tee body 12. At the opposite end of each of the barrels 21, a shaft 23 is inserted into the barrel 21 and allowed to slidably move into and out of the barrel 21. In one exemplary embodiment the extendable link 40 (or barrel 21 and shaft 23) are telescoping parts. In another exemplary embodiment the extendable link 40 or barrel 21 may be a pneumatic or hydraulic cylinder with the shaft 23, for example, functioning as a piston, or may be spring loaded. The extendable link may function to urge, bias or maintain the door 24 in the closed position (FIG. 3) and/or the open position (FIG. 6). The opposite end of each shaft 23 is inserted into an open bracket 25 defined on one end of an arm 22. The connection between each shaft 23 and each bracket 25 should allow the shaft 23 to pivot, swivel or rotate within the bracket 25 about the connection point.

One of the arms 22 may be connected to, and may be unitary or integral with, a handle 26. As depicted in FIG. 1, the handle 26 is connected (in a unitary manner and preferably aligned) to the arm 22a. The handle 26 should be configured to be accessible by the operator of the system from the operating or front side 30. In the closed position, the handle 26 may extend above the flange 16 for ease of access by the operator of the transportation system. The second arm 22b in FIG. 1 defines a means for fastening or a fastener port 29, for fastening to the tee body 12. In alternative exemplary embodiments, the handle 26 may be connected to, contiguous with or unitary with the arm 22b, and the fastener port 29 may be defined instead on the arm 22a. Although one handle 26 is currently preferred, in certain exemplary embodiments greater than one handle 26 may be implemented (e.g., such as connected to arm 22b).

The ends of the arms 22 not connected with the shaft 23 are pivotally coupled with the door 24. Further, when the unload tee 10 is in the fully open position (see FIGS. 1, 1A and 6) the arms 22 may define a void 27 (defined between the first arm 22a and the second arm 22b) such that the arms 22 (or other parts of the door assembly 20) allow or do not inhibit the flow or delivery of a volume of materials 70 from the opening 13.

Figure 2:
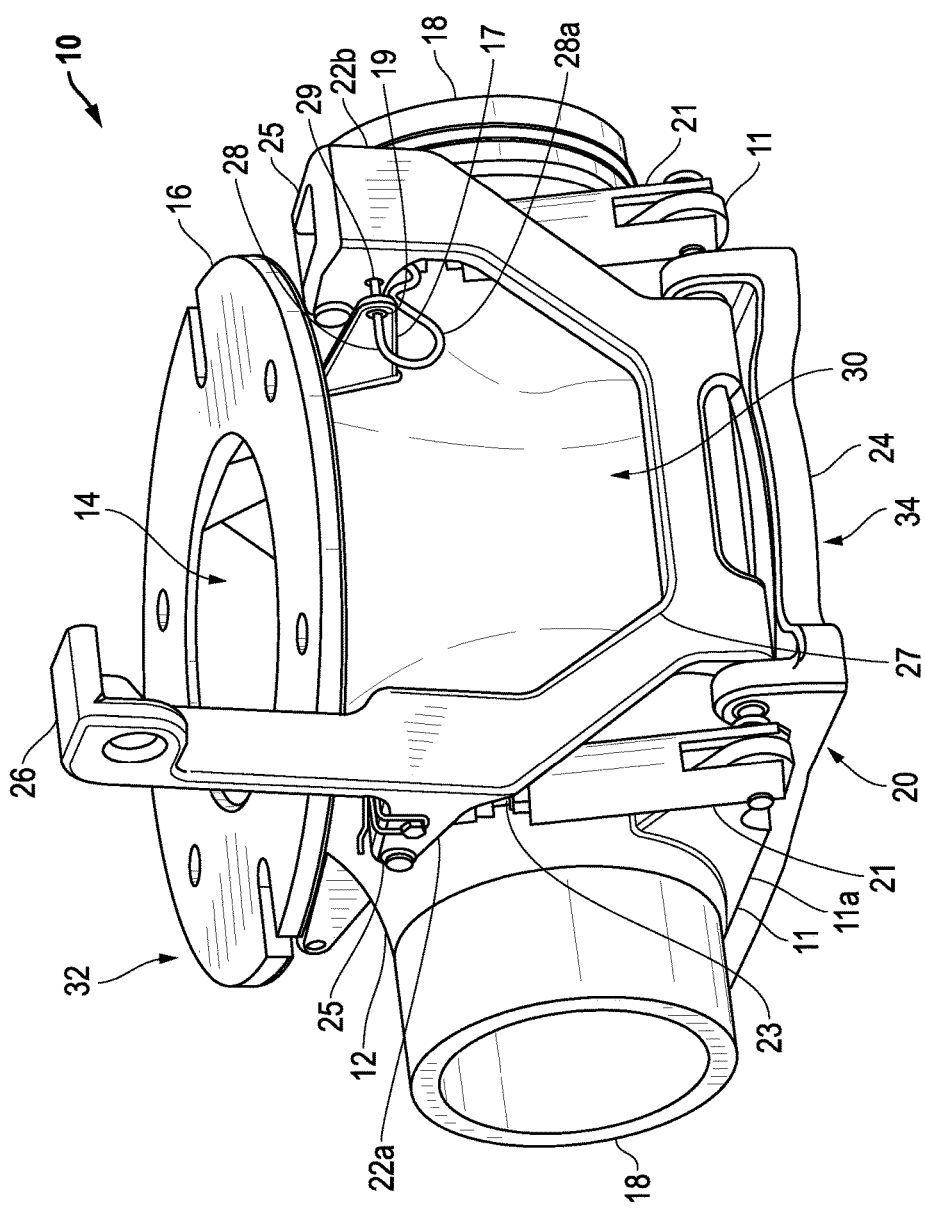
FIG. 2 depicts a perspective view of an exemplary embodiment of an unload tee in a closed position.
Figure 3:
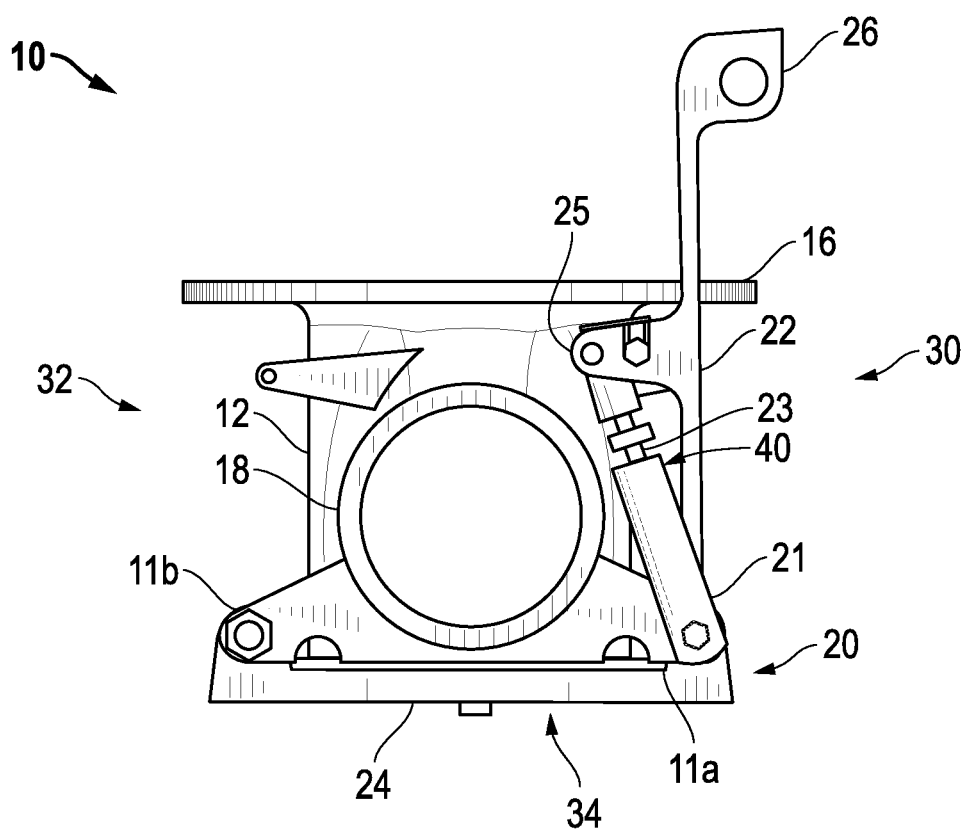
FIG. 3 depicts a side view of an exemplary embodiment of an unload tee in a closed position.

When in the unload tee 10 is in the closed position, as is depicted in FIGS. 2 and 3, a fastener 28 may be used to secure the door assembly 20 and the tee body 12. The fastener 28, as depicted, is a clevis pin 28a inserted through fastener port 19 on the projection 17 of the body 12 and fastener port 29 on the arm 22b, but other safe means of fastening may be implemented as is known in the art. The fastener 28 should be easily removed and reusable to allow for ease and efficiency of operation. In an exemplary embodiment, the fastener 28 and fastener ports 19, 29 may be located on the operating or front side 30 of the unload tee 10.

FIGS. 3-6 depict a side view of the unload tee 10 as the unload tee 10 moves between a fully closed position (in FIG. 3), to partially open positions (in FIGS. 4-5), and then subsequently to a fully open position (in FIG. 6). The progressive opening of the unload tee 10 from FIGS. 3 to 4, from FIGS. 4 to 5, and from FIGS. 5 to 6 (or also from FIGS. 3 to 6) may all occur with one motion or action from the operator (normally a human) exerting force onto the handle 26. The closing of the unload tee 10, may also likewise occur with a singular motion or action from the operator onto the handle 26. Preferably, the foregoing one opening action and singular closing action are exclusive of any additional (external) motive force or action for opening and/or closing of the door 24. As depicted in the closed tee 10 position seen in FIGS. 2 and 3, the handle 26 is aligned with the bore 14 of the tee body 12 and raised above the flange 16 in the closed position. The extendable link 40 is in a first position wherein the extendable link 40 is shortened as shown in FIG. 2, FIG. 3 and/or FIG. 4. Further, the fastener 28 may be engaged with the fastener ports 19 and 29 to secure and retain the door assembly 20 in the desired closed position. When the operator needs to deliver the desired bulk materials, goods or product through the unload tee 10 to the desired location (or otherwise needs to manipulate unload tee 10 into an open position), the fastener 28, if implemented, is first removed or disengaged from the fastener ports 19 and 29.

Figure 4:
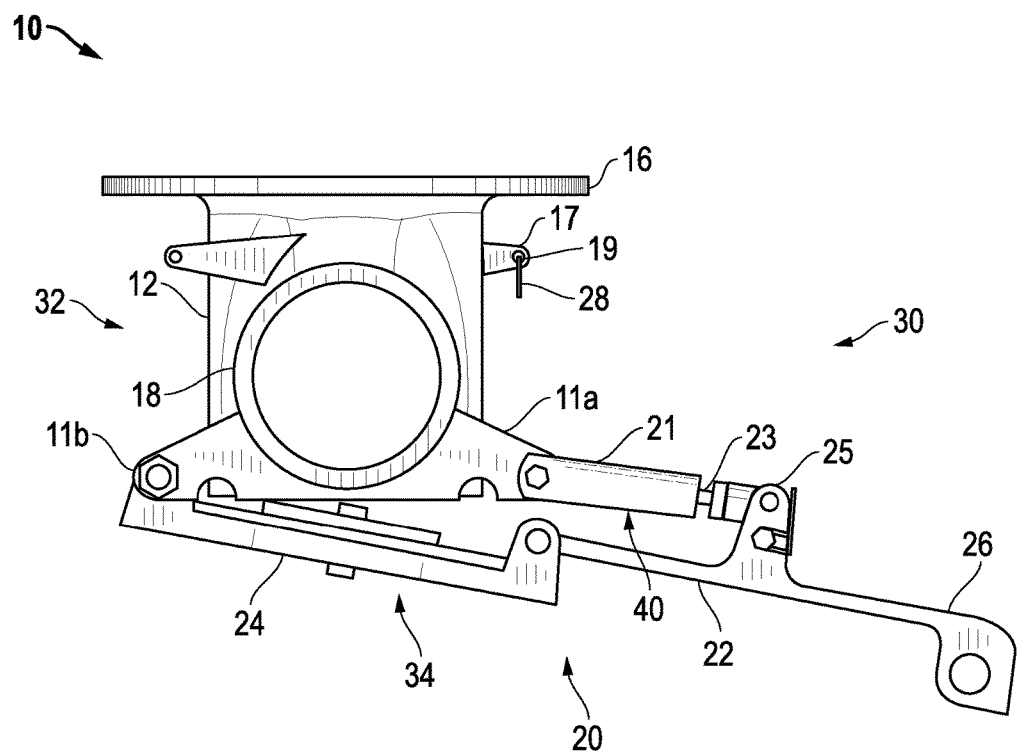
FIG. 4 depicts a side view of an exemplary embodiment of an unload tee in a partially open position following the position of FIG. 3 when opening.

Then the operator manipulates or pulls the handle 26 to move outwards and away from its upright position adjacent to the tee body 12 to a partially open position of the unload tee 10 as depicted in FIG. 4. When the handle 26 is thus manipulated, the barrels 21 pivot about the front beams 11a to extend outwards and away from the tee body 12. The extendable link 40 may remain in the first position (where the extendable link 40 remains shortened) in FIG. 4. The handle 26 transfers the movement from the operator to the arms 22 as well, which pivot about their connection to the door 24 to point towards the front side 30, and may cause the door 24 to move slightly ajar and reveal the opening 13 as the door pivots about the rear beam(s) 11b.

Figure 5:
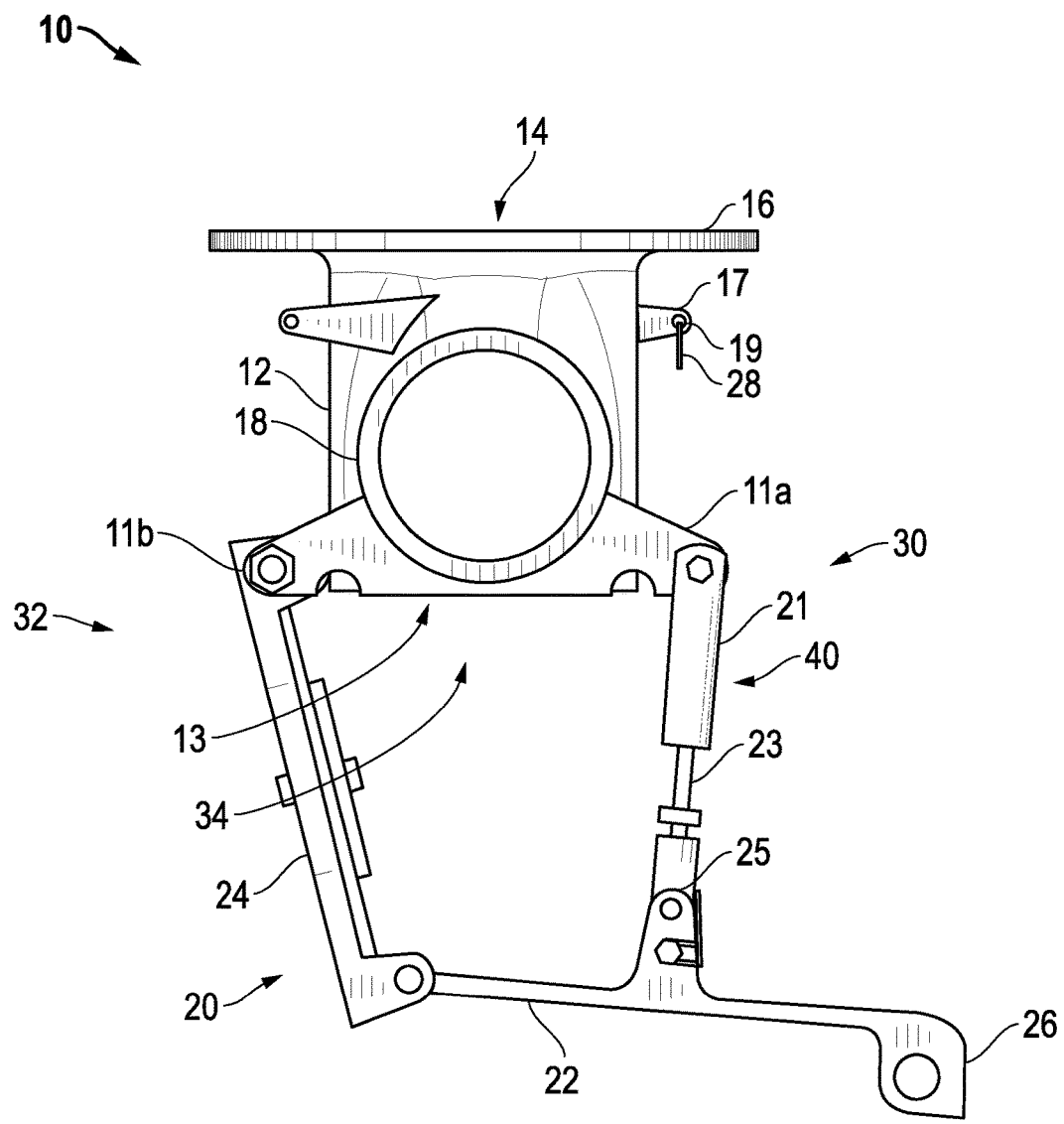
FIG. 5 depicts a side view of an exemplary embodiment of an unload tee in another partially open position following the position of FIG. 4 when opening.

To further open the unload tee 10, the handle 26 is further manipulated or pushed downwards into another partially open position as seen in FIG. 5 following the position of FIG. 4 when opening. The barrels 21 shown at this position have pivoted to point downwards and the shaft 23 may adjust in or out of the barrels 21 to compensate for any necessary distance/tension as the arms 22 move. Thus, the extendable link 40 may slidably lengthen in the second position (as depicted in FIGS. 1, 1A, and/or 5-6) relative to the first position of the extendable link 40 (which is depicted in FIGS. 2, 3 and/or 4, wherein the extendable link 40 is shortened). The door 24 also pivots open about the rear beams 11b, further revealing opening 13.

FIG. 6 depicts a side view of an exemplary embodiment of the unload tee 10 in a fully open position. To move the unload tee 10 to the fully open position in FIG. 6 from the partially open position in FIG. 5, the handle 26 is further manipulated to push the door 24 further open and away from the opening 13. In order to transition from the partially open position in FIG. 5 to the fully open position in FIG. 6, the barrels 21 pivot or reverse about the front beams 11a to point backwards, or reverse, towards the door 24 upon transferred motion from the handle 26. Each of the arms 22 also pivot about the bracket connection 25 with the shafts 23 such that the handle 26 is angled upwards towards the operator for single sided operation from the front side 30 when the operator desires to close the unload tee 10. In the fully open position of the unload tee 10 in FIGS. 1 and 6, the door 24 and the arms 22 (and all other parts of the door assembly 20) do not block or inhibit a direct materials flow from the opening 13. Thus the unload tee 10 may be manipulated into an open position with one action/exertion from the operator onto the handle 26, as the motion from the operator onto handle 26 may be transferred to the various components and enables moving or pivoting points, and/or joints of the unload tee 10. At this point, the operator may decide to open the control valve connected to the flange 16, or manipulate a valve at another point in the pipe system, to allow a flow of materials through the opening 13 to the desired location. When satisfied with the delivery of materials, the operator may shut off the valve and reverse the steps of opening the unload tee 10 to fully close the tee 10. Preferably, the length of the door 24 is less than the clearance between the underside/lower end of tee body 34 and the surface of the ground.

To close the unload tee 10 from the fully open position as shown in FIG. 6, the handle 26 is pulled upward and forward or away from the tee body 12. The barrels 21 and shafts 23 pivot away and downwards from the body 12 as depicted FIG. 5. Continued pulling of the handle 26 towards the operator or the front/operating side 30 will extend the barrels 21 to point outward from the body 12 and towards the front side of operation 30, as seen in FIG. 4. The shafts 23 may progressively contract, insert, or slide inwards or shorten into the barrels 21 when the unload tee 10 is moved more towards a fully closed position. Finally, the handle 26 may be lifted above the flange 16, the motion of which causes the barrels 21 to flip or fold upward and over the front beams 11a and closes the tee door 24 against the opening 13. Thus the unload tee 10 may be manipulated into a closed position with one motion or action from the operator onto the handle 26, as the motion from the operator onto handle 26 may be transferred to the various components and enables moving or pivoting points, and/or joints of the unload tee 10. The unload tee 10 may now be secured into the fully closed position by engaging the optional fastener 28 with fastener ports 19, 29 on the body 12 and arms 29 respectively.

All pivots/pivotables shown and/or described herein in an exemplary embodiment may be made from a hinge with linkage (as shown) or in any other manner known to one of ordinary skill in the art.

While the exemplary embodiments are described with reference to various implementations and exploitations, it will be understood that these exemplary embodiments are illustrative and that the scope of the inventive subject matter is not limited to them. Many variations, modifications, additions and improvements are possible. For example, while the implementations and techniques used herein are discussed primarily in relation to the bulk handling transportation industries, alternative exemplary embodiments of the unload tee 10 may be applied to alternate industries, such as, by way of example only, petrochemical, irrigation, food and beverage industries and the like.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method of unloading a volume of materials through an unload tee, comprising the steps of:
   manipulating a handle of the unload tee with one action;
   opening a door of the unload tee according the step of manipulating the handle;
   pivoting an arm connected to an extendable link relative to the extendable link via said step of manipulating the handle;
   pivoting the extendable link connected to the unload tee relative to the unload tee;
   pivoting the door connected to the arm relative to the arm;
   wherein said step of opening the door further comprises pivoting the door connected to the unload tee relative to the unload tee; and
   extending the extendable link in response to said steps of pivoting the arm and pivoting the door.

2. A method of unloading a volume of materials through an unload tee, comprising the steps of:
   manipulating a handle of the unload tee with one action;
   opening a door of the unload tee according the step of manipulating the handle;
   wherein said step of manipulating the handle further comprises the handle connected to an arm, wherein the arm is pivotally connected to an extendable link, and wherein the arm is pivotally connected to the door at one end of the arm;
   transferring motion from the handle to the arm and the extendable link, wherein the extendable link is capable of shortening and lengthening and is pivotally connected to a front beam of the unload tee;
   pivoting the extendable link about the front beam;
   lengthening the extendable link; and
   pivoting the arm about the extendable link for opening the door.

3. The method according to claim 2, wherein the step of manipulating the handle enables the steps of:
   pivoting the extendable link about the front beam;
   lengthening the extendable link;
   pivoting the arm about the extendable link; and
   opening the door of the unload tee.

4. The method according to claim 2, further comprising the steps of:
   opening a controllable valve connected to the unload tee; and
   allowing the volume of materials to flow past the arm to a desired destination for the volume of materials.

5. The method according to claim 2, further comprising the step of securing a second arm to the tee body when the unload tee is in a closed position.

6. The method according to claim 5, further comprising the steps of pivoting a barrel about the front beam and inverting the barrel beneath the front beam.

7. The method according to claim 1, further comprising the step of closing the door of the unload tee according to another step of manipulating the handle of the unload tee with one action.

8. The method according to claim 2, further comprising the step of closing the door of the unload tee according to another step of manipulating the handle of the unload tee with one action.

9. A method of unloading a volume of materials through an unload tee, comprising the steps of:
   manipulating a handle of the unload tee with one action,
   opening a door of the unload tee according the step of manipulating the handle;
   closing the door of the unload tee according to another step of manipulating the handle of the unload tee with one action;
   wherein said step of closing the door of the unload tee according to another step of manipulating the handle of the unload tee with one action further comprises the handle connected to an arm, wherein the arm is pivotally connected to an extendable link, and wherein the arm is pivotally connected to the door at one end of the arm;

transferring motion from the handle to the arm and the extendable link, wherein the extendable link is capable of shortening and lengthening and is pivotally connected to a front beam of the unload tee;

pivoting the extendable link about the front beam;

shortening the extendable link; and pivoting the arm about the extendable link for closing the door.

10. The method according to claim 9, wherein the step of closing the door of the unload tee according to another step of manipulating the handle of the unload tee with one action enables the steps of:

pivoting the arm about the extendable link;

shortening the extendable link;

pivoting the extendable link about the front beam; and closing the door of the unload tee.

11. A method of unloading a volume of materials through an unload tee, comprising the steps of:

manipulating a handle of the unload tee with one action;

opening a door of the unload tee according the step of manipulating the handle;

closing the door of the unload tee according to another step of manipulating the handle of the unload tee with one action;

pivoting an arm connected to an extendable link relative to the extendable link via said step of another step of manipulating the handle;

pivoting the extendable link connect to the unload tee relative to the unload tee;

pivoting the door connected to the arm relative to the arm;

wherein said step of closing the door further comprises pivoting the door connected to the unload tee relative to the unload tee; and shortening the extendable link in response to said steps of pivoting the arm and pivoting the door.

12. A method of unloading a volume of materials through an unload tee, comprising the steps of:

manipulating a handle of the unload tee with one action;

opening a door of the unload tee according the step of manipulating the handle;

closing the door of the unload tee according to another step of manipulating the handle of the unload tee with one action; and urging/biasing the door of the unload tee into a fully closed position via two extendable links connected respectively at one end to opposite sides of the door, and rotatably coupled at another end respectively to two front beams located on opposite sides of a tee body.

13. A method of unloading a volume of materials through an unload tee, comprising the steps of:

manipulating a handle of the unload tee with one action;

opening a door of the unload tee according the step of manipulating the handle;

closing the door of the unload tee according to another step of manipulating the handle of the unload tee with one action;

wherein said step of closing the door of the unload tee according to another step of manipulating the handle of the unload tee with one action further comprises the handle connected to two arms, wherein the arms are pivotally and respectively connected to two extendable links, wherein the arms are respectively pivotally connected to the door at one end of the arms, wherein the extendable links are respectively pivotally connected to a front beam of the unload tee; and exerting the one action via an operator.

14. The method according to claim 13, further comprising the steps of:

pivoting the handle away from the unload tee and toward the operator;

shortening the extendable link; and flipping the extendable link up over the front beam when lifting the handle above a flange of the unload tee.

\* \* \* \* \*